United States Patent Office 3,546,973
Patented Dec. 15, 1970

3,546,973
HYDRAULIC CONTROL SYSTEM FOR
AUTOMATIC TRANSMISSION
Koichi Ohie, Yokohama, Tetsuya Iijima and Katsuo
Yamada, Tokyo, and Toshio Miyazaki, Yokohama,
Japan, assignors to Nissan Jidosha Kabushiki Kaisha,
Yokohama, Japan
Filed Dec. 11, 1968, Ser. No. 783,003
Claims priority, application Japan, Feb. 3, 1968,
43/6,253
Int. Cl. B60k 21/10; F16h 47/08
U.S. Cl. 74—868                                    1 Claim

ABSTRACT OF THE DISCLOSURE

A hydraulic control system for automatic transmissions for vehicles to provide proper timing relation between engagement and disengagement of the friction elements by utilizing, a valve means controlled by governor pressure and one of the pressure signals representing engine torque, to restrict fluid passage to high gear ratio clutch at a low engine torque condition.

---

The present invention relates generally to a control system for a multiple speed ratio power transmission mechanism, and more particularly to a hydraulic control system for an automatic transmission of a vehicle, the transmission having an input and an output shaft, at least one planetary gear unit disposed between the shafts, and a plurality of friction elements to effect a plurality of gear ratios by selectively engaging or disengaging the friction elements by hydraulic pressure produced in the hydraulic control system.

To attain smooth shifting between a lower gear ratio and a higher gear ratio by the above mentioned automatic transmission, means must be provided to prevent excess shock caused by too much engaging torque capacity of the friction elements or excess slipping caused by too little torque capacity, and further, timing relation between disengagement of one friction element and engagement of other friction element must be carefully destermined. The timing relation must be changed corresponding to operating conditions of the vehicle.

The above mentioned automatic transmission further includes a first friction element to attain higher gear ratio by engagement thereof, a first hydraulic servo to actuate the first friction element, a second friction element to attain lower gear ratio by engagement thereof, and a second hydraulic servo to actuate the second friction element, where the second hydraulic servo disengages the second friction element by a spring force and area difference when the same hydraulic pressure is applied to both sides of the servo piston simultaneously. By proper selection of the spring force and the area difference, timing of the disengagement of the second friction element is determined relative to the engagement of the first friction element. The timing generally accommodates to a full load condition of the engine. However, proper timing relation between engagement of the first friction element and disengagement of the second friction element differs according to operating conditions of the vehicle. As mentioned above, the above mentioned mechanism cannot be accommodated to all operating conditions, e.g. when the mechanism provides proper timing relation at full load condition, uncomfortable shock will occur at light load condition.

For example, when an intermediate gear brake is engaged at 2nd speed ratio and a direct coupling clutch engages at 3rd speed ratio, at upshift from 2nd to 3rd speed ratio, if both friction elements engage simultaneously, the output shaft is braked, and if both friction elements are disengaged the engine will rotate freely.

In this case, as to the engagement and disengagement timing relation of the friction elements, a proper overlap of engagement of the friction elements will provide smooth upshifting by forcibly rotating the friction elements when engine input torque is high enough. If instantaneous neutral condition occurs by disengagement of both friction elements, engine rotation will increase resulting in runaway of the engine.

On the contrary, when the operating condition is one of vehicle coasting or one requiring low engine torque overlap of engagement of both friction elements will result in a braking action of the output shaft because of low torque and uncomfortable shock will occur. By providing proper time lag or instantaneous neutral condition between engagement and disengagement of the friction elements, smooth upshift without any shock or runaway will be performed at the low engine torque operating condition.

Accordingly, it is primary object of the present invention to provide a hydraulic control system having a simple valve means to control timing relation between engagement and disengagement of friction elements so as to obtain smooth shifting throughout different operating conditions of the vehicle.

More particularly, it is an object of the present invention to provide a hydraulic control system having a simple valve means, the valve spool thereof being shifted by hydraulic control passages to decrease fluid pressure in the hydraulic servo of the friction element which is to be engaged when upshifting from intermediate to high speed ratio at low torque operating conditions so as to perform proper timing relation between engagement and disengagement by delayed engagement of the friction element due to delayed pressurization of the servo to accommodate the operating condition.

Thus, by providing overlap of engagement of the both friction elements to accommodate high input torque condition by transmission mechanism, and by providing the above mentioned valve means according to the invention, to attain delayed engagement of the friction element to accommodate low torque condition, smooth shifting operation can be attained all through the operating conditions.

Further and more specific objects, features and advantages of the present invention and the manner in which the invention is carried into practice are made apparent in the following detailed description of preferred embodiment, by way of example, wherein reference is made to the accompanying drawing, in which:

In the drawing, same reference numerals are used on similar parts for the sake of clarity.

Figure 1:
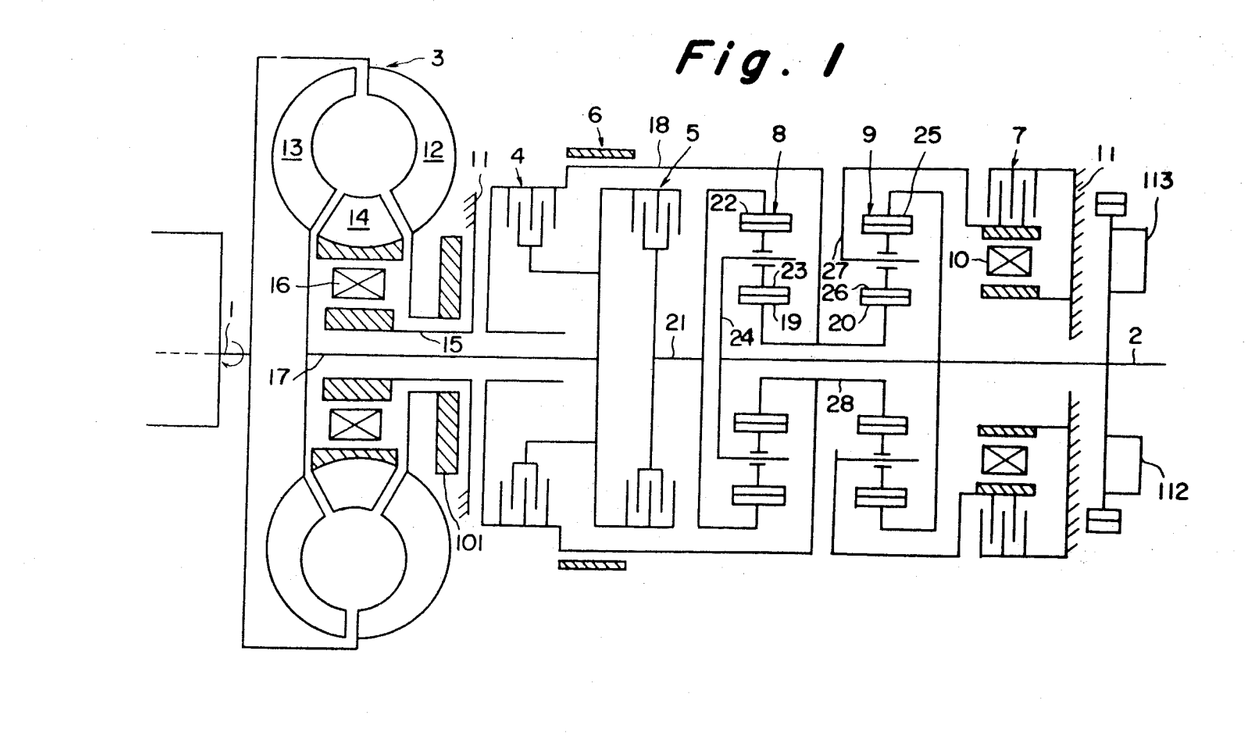
FIG. 1 shows a diagrammatic illustration of a power transmission mechanism of an automatic transmission of a vehicle.

FIG. 1 shows in a schematic form a typical power transmission mechanism providing a three element torque converter unit and two planetary gear units. While this is used as an example to describe the invention, it will be understood, that the present invention has application to any apparatus comprising a torque converter or a hydraulic coupling unit and a plurality of planetary gear units and providing hydraulic control system to effect automatic shifting between speed ratios.

The transmission mechanism shown comprises an input shaft 1, and output shaft 2, a torque converter assembly 3, two friction clutches 4 and 5, two friction brakes 6 and 7, each clutch and brake being actuated by hydraulic pressure, two planetary gear units 8 and 9, a one-way brake 10 and a casing 11 accommodating the planetary gear units and the friction elements. The torque converter 3 comprises an impeller 12 connected to the input shaft 1, a turbine 13 which is driven by the impeller 12, and a stator 14 which is connected to a stationary shaft 15 through a one-way clutch 16, and is filled with working fluid transmitting the driving torque. The power transmitted by the engine drive shaft 1 through the impeller 12 and the working fluid to the turbine 13 is transmitted through an intermediate shaft 17 which is connected to the turbine 13 and to the friction clutches 4 and 5.

The friction clutch 4 is connected through a drum 18 to sun gears 19 and 20 of the planetary gear units 8 and 9 respectively. The friction clutch 5 is connected through an intermediate shaft 21 to a ring gear 22 of the planetary gear unit 8. A plurality of planet gears 23 meshing with the ring gear 22 and the sun gear 19 are supported by a carrier 24 secured to the output shaft 2 which is also secured to a ring gear 25 of the rear planetary gear unit 9. A plurality of planet gears 26 meshing with the ring gear 25 and the sun gear 20 are supported by a carrier 27 which is connected to the friction brake 7 and the one-way brake 10. The friction brake 7 clamps by engagement thereof the planet gear carrier 27 and the one-way brake 10 permits rotation of the carrier 27 only to the direction of the input shaft 1 indicated by an arrow. The friction brake 6 clamps, by tightening to the drum 18, the sun gears 19 and 20 through a hollow transmission shaft 28.

The transmission mechanism shown in FIG. 1 provides three forward and one reverse speed ratios by suitable engagement of the friction elements as shown in Table 1.

TABLE 1

| Speeds | Gear ratio | Friction elements engaged | | | | |
| --- | --- | --- | --- | --- | --- | --- |
| | | Clutch 4 | Clutch 5 | Brake 6 | Brake 7 | One-way brake 10 |
| 1st | 2.45 | — | 0 | — | — | 0 |
| 2nd | 1.45 | — | 0 | 0 | — | — |
| 3rd | 1.00 | 0 | 0 | — | — | — |
| 1st (manual low) | 2.45 | — | 0 | — | 0 | 0 |
| Reverse | 2.18 | 0 | — | — | 0 | — |

In the Table 1: "0" shows engagement of the friction element or locking of the one-way brake; and "—" shows disengagement or free relative rotation thereof.

In FIG. 1, no hydraulic control system actuating the friction elements are shown, however, a few of the functional members are shown. These are an engine driven fluid pump 101 and a governor valve assemly 112 and 113 which is connected to the output shaft 2.

Figure 2:
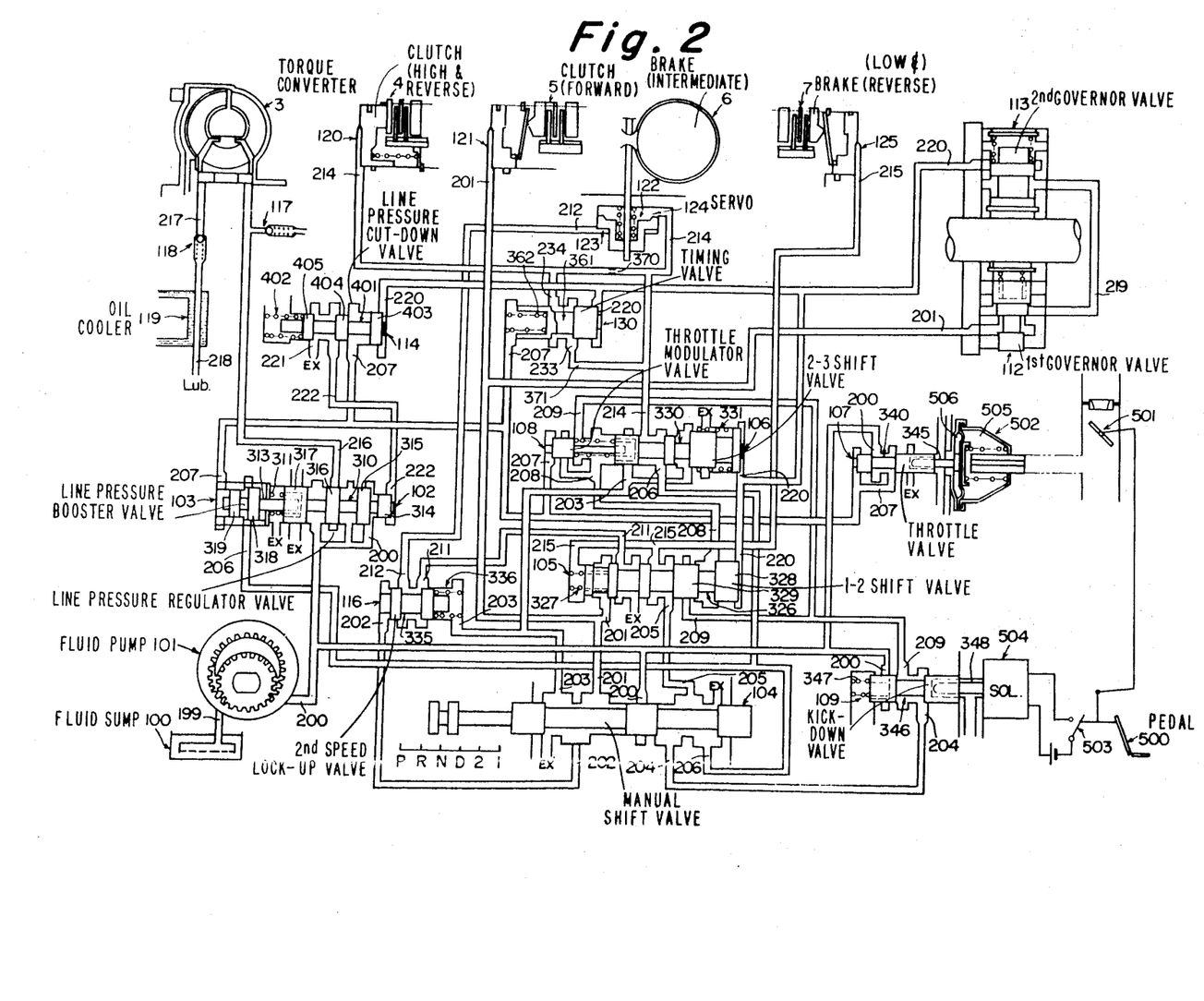
FIG. 2 shows a diagram of the one embodiment of hydraulic control system, according to the invention, to control the transmission shown in FIG. 1.

FIG. 2 shows a hydraulic circuit diagram of a hydraulic control system which is adapted to control the power transmission mechanism shown in FIG. 1, according to one preferred embodiment of the present invention. The hydraulic control system comprises a fluid sump 100, the fluid pump 101, a line pressure regulator valve 102, a line pressure booster valve 103, a manual shift valve 104, a 1–2 shift valve 105, a 2–3 shift valve 106, a throttle valve 107, a throttle modulator valve 108, a kick-down valve 109, a first governor valve 112, a second governor valve 113, a line pressure cut down valve 114, a 2nd speed lock up valve 116, a timing valve 130, a torque converter relief valve 117, and a torque converter check valve 118 to effect desired automatic shifting between the above mentioned speed ratios by introducing predetermined line pressure to the friction elements. The control system further includes a torque converter oil cooler 119, a hydraulic servo 120 to engage the friction clutch 4 by introducing hydraulic pressure to the servo 120, a hydraulic servo 121 to actuate the friction clutch 5, a hydraulic servo 122 to actuate the friction brake 6, an engage side brake chamber 123 and a release side brake chamber 124 of the hydraulic servo 122, a hydraulic servo 125 to actuate the friction brake 7, also control components including an acceleration pedal 500, a carburetor throttle valve 501, a vacuum diaphragm unit 502, a kick-down switch 503 to actuate the throttle valve 107 and a kick-down solenoid 504, and further, actuating and controlling conduits and passages properly connecting the valves and components are included to provide desired hydraulic control of automatic transmission.

A single hydraulic pressure source serving as, actuating fluid of the hydraulic control system, working fluid of the torque converter 3 and lubricant fluid of the transmission mechanism is delivered by the positive displacement fluid pump 101 which is driven by the engine as shown in FIG. 1 and is adapted to draw fluid from the sump 100 through suction line 199 and to supply fluid under pressure to the above mentioned components through passage 200. The fluid pressure in the passage 200 is main source of the hydraulic circuit and is mentioned as line pressure.

The line pressure through passage 200 is regulated by the line pressure regulator valve assembly 102 and 103 as will be described more fully hereinafter. Fluid under pressure which is supplied to the torque converter 3 from the passage 200 through the pressure regulator valve 102 and passage 216 is regulated by the torque converter relief valve 117 which prevents fluid pressure from increasing beyond a predetermined value. Fluid pressure in the torque converter 3 is maintained by the torque converter check valve 118, and the fluid passed through the check valve 118 is delivered through an oil cooler 119 to portions to be lubricated.

The manual shift valve 104 comprises a valve spool 320 which is operated by the vehicle operator to introduce line pressure in the passage 200 to passages 201 through 206 as shown in Table 2, according to the selected position of the shift lever not shown.

TABLE 2

| | Selected position | | | | | |
| --- | --- | --- | --- | --- | --- | --- |
| | P | R | N | D | 2 | 1 |
| Passage: | | | | | | |
| 201 | — | — | — | 0 | 0 | 0 |
| 202 | — | — | — | 0 | 0 | — |
| 203 | — | — | — | 0 | — | — |
| 204 | 0 | 0 | — | — | 0 | 0 |
| 205 | 0 | 0 | — | — | — | 0 |
| 206 | — | 0 | — | — | — | — |

In the Table 2: "0" shows communication of the passage to line pressure at the selected position; and "—" shows communication to exhaust port at the selected position. The operation of the power transmission mechanism shown in FIG. 1 according to the selected positions P, R, N, D, "2" and "1" will be as follows:

P: The output shaft 2 is locked by a locking device not shown;

R: reverse drive,

N: neutral, power is not transmitted to output shaft 2,

D: forward drive, the transmission shown is shifted automatically between 1st, 2nd and 3rd speed ratios, "2": lock to 2nd speed ratio, "1": down shift from 2nd to 1st speed ratio and maintaining to 1st speed ratio.

The manual shift valve spool 320 is shown in the neutral or position N in FIG. 2, thus blocking all operating passages from line pressure and communicating to exhaust ports Ex which communicate to the sump 100 through passages not shown.

When the operator shifts the manual shift valve 104 to the automatic three speeds forward position D, passages 201, 202 and 203 communicate to the line pressure passage 200. The line pressure supplied through passage 201 actuates the hydraulic servo 121 to engage the friction clutch 5 all though the three speeds forward drive. Further, passage 201 communicates to the 1-2 shift valve 105 and the first governor valve 112. The line pressure through the passage 203 is supplied to the 2-3 shift valve 106.

The 1-2 shift valve 105 comprises a valve spool 326 which is biased by a spring 327 to keep the valve spool 326 to the rightward position as shown in FIG. 2 at 1st speed ratio and blocks the passage 201 from communication anywhere. Thus only the friction clutch 5 is engaged, and the vehicle drives forward at 1st speed ratio as shown in Table 1 owing to the engagement of the one-way brake 10. In this case, as one-way brake 10 is effective, the engine drives the wheels, but the wheels cannot drive the engine, so that an engine brake function is not effective owing to free rotation of the one-way brake 10. As the vehicle speed increases, governor pressure produced by the governor valve assembly 112 and 113, as will be explained in more detail hereinafter, through passage 220 urges the valve spool leftward, so that passage 201 communicates to passage 211 to apply the engage side chamber 123 of the hydraulic servo 122 of the friction brake 6. Thus the friction brake 6 is engaged to attain 2nd speed ratio of the power transmission mechanism as shown in Table 1.

The 2-3 shift valve 106 comprises a valve spool 330 which is biased to the rightward position as shown in FIG. 2 by a spring 331 at 1st and 2nd speed ratios. As the vehicle speed further increases, governor pressure through passage 220 is increased sufficiently to urge the valve spool 330 leftward to communicate passage 203 to passage 214 through a groove of the valve spool 330. Line pressure through passage 214 is supplied to the hydraulic servo 120 to engage the friction clutch 4 and also to the release side chamber 124 of the hydraulic servo 122 to release the friction brake 6. By providing an area difference between the chambers 124 and 123, the friction brake is released when both chambers 124 and 123 are supplied by line pressure, so that smooth shift process between the 2nd and 3rd speed ratios is attained. Thus as shown in Table 1 the power transmission mechanism shown in FIG. 1 is driven in the 3rd speed ratio or direct coupling.

When the operator selects the position "2" by shifting the manual shift valve 104, line pressure through passage 200 is supplied to passages 201, 202 and 204. Line pressure through passage 201, as at selected position D, engages the friction clutch 5.

The 2nd speed lock up valve 116 comprises a valve spool 335 which is biased to leftward position as shown in FIG. 2 by a spring 336 when passages 202 and 203 are both connected to line pressure or the exhaust port, so that passages 211 and 212 are communicated with each other. Thus when passage 211 is communicated to line pressure, the pressure is supplied to the engage side chamber 123 of the hydraulic servo 122 to engage the friction brake 6. When the position "2" is selected, passage 202 communicates to line pressure and passage 203 communicates to exhaust port, and thus the valve spool 335 is urged rightward to communicate passage 202 to passage 212 so that line pressure is supplied to the engage side chamber 123 of the hydraulic servo 122 to engage the friction brake 6. Thus 2nd speed ratio is attained. The valve spool 335 maintains the rightward position throughout the selected position "2" and is not affected by vehicle operating conditions such as speed or throttle opening.

When the operator selects the position "1" by shifting the manual shift valve 104, line pressure through passage 200 is communicated to passages 201, 204 and 205. As before, line pressure through passage 201 acts to engage the friction clutch 5 all through the position "1." Line pressure through passage 205 communicates to passage 215 when the 1-2 shift valve 105 is rightward position as shown in FIG. 2, so that the line pressure actuates the hydraulic servo 125 to engage the friction brake 7, and thus 1st speed ratio is obtained. If the 1-2 shift valve 105 is kept leftward by governor pressure through passage 220, when the manual shift valve is shifted to the position "1" from other positions, passage 201 communicates through passage 211, the 2nd speed lock up valve 116 and passage 212 to engage apply side chamber 123 of the hydraulic servo 122 to engage the friction brake 6. Thus 2nd speed ratio is attained. At the position "1," passages 203 and 206 are exhausted so that 3rd speed ratio cannot be attained because the friction clutch 4 is not engaged. When the 1-2 shift valve 105 is urged to rightward, 1st speed ratio is attained as before, and line pressure through passage 215 urges the valve spool 326 from left end surface of the spool 326, so that 1st speed ratio is maintained. In this case, as the friction brake 7 is engaged, the planet carrier 27 of the rear planetary gear unit 9 is clamped in both directions, so that an engine brake function can be obtained, compared to 1st speed ratio of the position D.

When the manual shift valve 104 is shifted to reverse drive position R, line pressure through passage 200 is supplied to passages 204, 205 and 206. Line pressure through passage 205 is applied to engage the friction brake 7 as before, and line pressure through passage 206 is communicated through the 2-3 shift valve 106 and passage 214 to the hydraulic servo 120 to engage the friction clutch 4, thus, as shown in Table 1, the output shaft 2 of the power transmission mechanism rotates to reverse direction.

The governor valve assembly 112 and 113 is mounted to the output shaft 2 of the power transmission as shown in FIG. 1 and adapted to supply hydraulic pressure representing the vehicle speed to passage 220. The governor valve may be of any construction representing the vehicle speed, and in the illustrated embodiment, line pressure through passage 201 is introduced in the first governor valve 112 which is constructed as a pressure regulator valve to produce increasing hydraulic pressure as a function of increasing rotational speed of the output shaft 2. The pressure which is determined by equilibrium between centrifugal force, spring bias pressure, and hydraulic pressure is supplied through passage 219 to the second governor valve 113 constructed as a change-over valve and adapted to supply fluid pressure beyond a predetermined speed of the output shaft 2 or the vehicle to the passage 220. The governor pressure through passage 220 is supplied to the 1-2 shift valve 105 and the 2-3 shift valve 106 to urge the valve spools 326 and 330 respectively, as described before, when the vehicle speed exceeds respective predetermined values, so that communication passages of the line pressure are changed to effect automatic shifting between 1st through 3rd speed ratios. Also, the passage 220 is communicated to the right end surface of spool 401 of the line pressure cut-down valve 114 to regulate hydraulic pressure actuating the friction elements as will be explained in more detail hereinafter.

The kick down valve 109 comprises a valve spool 346 which is biased to the rightward position by a spring 347 to block communication between passages 200 and 209. Engaging the right end surface of the spool 346, the kick down solenoid 504 is provided. As the acceleration pedal 500 is depressed, the kick down switch 503 is closed to energize the solenoid 504 thus actuating rod 348 to urge the valve spool 346 leftward, so that line pressure through passage 200 communicates to passage 209. Fluid pressure through passage 209 communicates to a groove between area difference lands 328 and 329 of the 1-2 shift valve 105 to urge the spool 326 rightward when the spool 326 is in the leftward position. Also, the passage 209 communicates to the left end surface of the spool 330 of the 2–3 shift valve 106 to urge the spool 330 rightward. Consequently, the valve spool 330 or 326 will move rightward when the urging force overcomes the biasing force of the governor pressure through passage 220, so that down-shift from 3rd to 2nd or from 2nd to 1st speed ratio will be obtained.

To detect the engine torque, a signal representing throttle opening or negative pressure in intake manifold of the engine may be available. In the illustrated embodiment, the engine torque is detected by sensing negative pressure in the engine intake manifold. In the general gasoline engine, the engine torque is higher as negative pressure in the intake manifold becomes smaller. To detect the engine torque, the vaccum pressure diaphragm unit 502 is provided to engage the right end surface of the throttle valve 107, and when pressure in vacuum chamber 505 of the vacuum diaphragm unit 502 is equal to atmospheric pressure in chamber 506, throttle valve spool 340 is urged to leftward, and as the vacuum is increased in the chamber 505 the biasing pressure to the spool 340 is decreased. The throttle valve 107 regulates the line pressure through passage 200 by leaking a portion thereof to an exhaust port to produce a hydraulic pressure representing urging force of the vacuum diaphragm unit 502 and also representing the engine torque in passage 207. The throttle pressure through passage 207 is supplied to left end surfaces of the line pressure booster valve 103 and the throttle modulator valve 108, which is combined to the 2–3 shift valve 106, so that the valve spools are biased to regulate shift points or to regulate line pressure through passage 200.

The line pressure regulator valve assembly 102 and 103 consists of the line pressure regulator valve 102 comprising a spool 310 and a biasing spring 311 and the pressure booster valve 103 comprising a spool 313 which is assembled in line to the spool 310. Fluid pressure produced by the oil pump 101 is introduced through passage 200 between lands 314 and 315 of the spool 310 and urges the spool 310 leftward by the area difference between the lands 314 and 315 against the biasing spring 311. When the fluid pressure through passage 200 is higher than a predetermined value, the spool 310 is urged leftward to open communication between passages 200 and 216 and supply torque converter working fluid as previously mentioned. When the fluid pressure is further increased, the spool 310 moves leftward and land 317 thereof opens exhaust port to leak a portion of fluid and to reduce the hydraulic pressure in the passage 200. Thus, an equilibrium is produced between the urging force and the biasing spring force, consequently, the fluid pressure in passage 200 is regulated to desired line pressure.

The line pressure booster valve biases the spool 310 of the regulator valve 102 by the spool 313 when fluid pressure is applied to left end surface of land 319 through passage 206, or between area difference lands 318 and 319 through passage 206, so that line pressure increases to attain equilibrium between the forces. On the contrary, when fluid pressure is applied to right end surface of the spool 310 of the regulator valve 102 through passage 222, the regulated line pressure through passage 200 is decreased correspondingly to attain equilibrium again.

The line pressure cut-down valve 114 comprises a valve spool 401 and a biasing spring 402. Governor pressure through passage 220 is applied to right end surface of land 403 to urge the spool 401 leftward against the spring force, and throttle pressure through passage 207 is applied between area difference lands 403 and 404 to urge the spool 401 rightward. Thus, when the force produced by governor pressure is larger than the force produced by the spring 402 and throttle pressure, spool 401 is urged leftward to communicate passages 207 and 222, and when governor pressure is lower, the passage 222 is exhausted. Consequently, when the governor pressure is sufficiently high, throttle pressure through passage 207 is applied to both end surfaces of the line pressure regulator valve assembly 102 and 103 and as the land 314 is smaller than the land 319, line pressure increases as throttle pressure or engine torque increases.

The timing valve 130, according to one embodiment of the present invention, comprises a valve spool 361 and a spring 362 to bias the spool 361 rightward as shown in FIG. 2. To the left end surface of the spool 361 throttle pressure through passage 207 is communicated, and to the right end surface thereof governor pressure through passage 220 is communicated. Thus the spool 361 is urged rightward or leftward in relation to throttle pressure representing the engine torque and governor pressure representing the vehicle speed. The valve spool 361 may provide area difference between lands of both ends to modify the effect of the pressure signals to the necessary extent.

Passages 233 and 234 are connected to the timing valve to communicate between lands of the spool 361 when the spool is kept rightward as shown in FIG. 2 and to block the communication when the spool 360 is urged leftward. The other end of the passage 233 is connected to passage 214 between the release side fluid chamber 124 of the hydraulic servo 122 of the friction brake 6 and the 2–3 shift valve 106, and the other end of the passage 234 is connected to passage 214 between the release side chamber 124 and the hydraulic servo 120 of the friction brake 4, to provide by-pass connection of the passage 214 to the hydraulic servo 120 now having a restriction 370 to restrict fluid flow to the hydraulic servo 120. Passage 233 may provide another restriction 371 to regulate flow rate to the servo 120 when both passage 214 and passage 233 and 234 are communicated.

Figure 3:
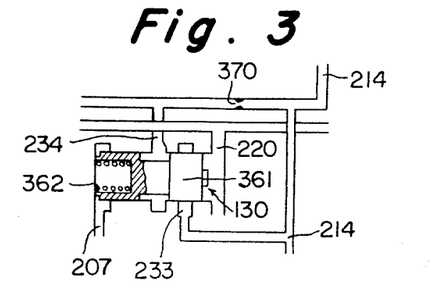
FIG. 3 shows operation of the timing valve shown in FIG. 2.

When the urging force by the spring 362 and throttle pressure through passage 207 is larger than the force by governor pressure, the valve spool 361 is urged rightward as shown in FIG. 2. Thus when passage 214 is communicated to line pressure to engage the friction clutch 4, fluid flows through passage 214 and passages 233 and 234 so that the friction clutch 4 engages quickly. On the contrary, when governor pressure through passage 220 exceeds the biasing force, the spool 361 is urged leftward as shown in FIG. 3 to block communication between passages 233 and 234 so that fluid flows only through passage 214 having the restriction 370 to effect delayed engagement of the friction clutch 4.

Figure 4:
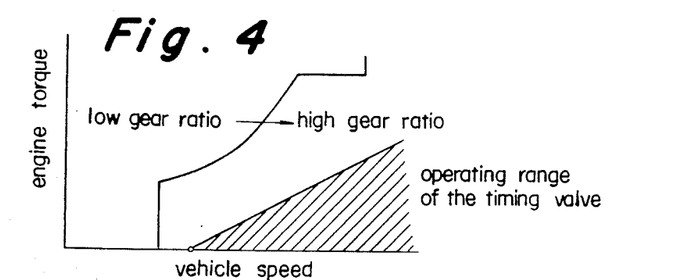
FIG. 4 shows the operation range of the timing valve shown in FIGS. 2 and 3 in relation to upshift characteristic.

FIG. 4 shows the operating range of the valve spool 361 of the timing valve 130 and the 2–3 upshifting characteristic in relation to vehicle speed and throttle pressure. The hatched space in FIG. 4 shows that the spool 361 is urged leftward as shown in FIG. 3.

Operation of the timing valve 130 is as follows: In case of 2–3 upshifting of high engine torque condition, as throttle pressure is high and the shift point is higher beyond the hatched space of FIG. 4, the friction clutch 4 engages quickly to cause overlap of engagement of the clutch 4 and disengagement of the brake 6, so that suitable timing relation to high engine torque condition is attained.

In case of 2–3 upshifting at low engine torque condition, i.e. when the accelerator pedal is quickly released while running, the shift point is in the hatched space shown in FIG. 4. As the valve spool 361 is urged leftward to block communication between passages 233 and 234, engagement of the friction clutch 4 is delayed so that the overlap is decreased or neutral condition of the engagement of the clutch 4 and disengagement of the brake 6 is caused to attain smooh upshifting at low engine torque condition.

When position "1" or "2" is selected by the manual shift valve 104, no fluid pressure is supplied to passage 214 so that no effect is caused by the timing valve 130. At position R, since no governor pressure through passage 220 is produced, the timing valve spool 360 is maintained to the right end position shown in FIG. 2 so that it has no effect on the actuation of the friction clutch 4.

Thus, by providing the timing valve 130 according to the present invention to regulate applying fluid flow to the friction clutch 4 by displacement of the valve spool 361 in relation to governor pressure representing the vehicle speed and throttle pressure representing the engine load, engagement of the friction clutch 4 is delayed at low engine torque condition so that desired upshift operation is performed without excess shock.

The pressure signals controlling the timing valve 130 according to the invention, including governor pressure representing the vehicle speed and throttle pressure representing the engine torque, are utilized in opposing relation. However, other pressure signals representing the engine load other than the throttle pressure are available through passage 207. Boost pressure which is regulated from throttle pressure can be utilized as a control pressure, signal, and line pressure which is affected by throttle pressure and indirectly represents the engine load can also be used. The above mentioned pressure signals are shown diagrammatically in FIG. 5 in relation to the engine torque, in which, line A shows line pressure, line B shows throttle pressure and line C shows throttle boost pressure.

Figure 6:
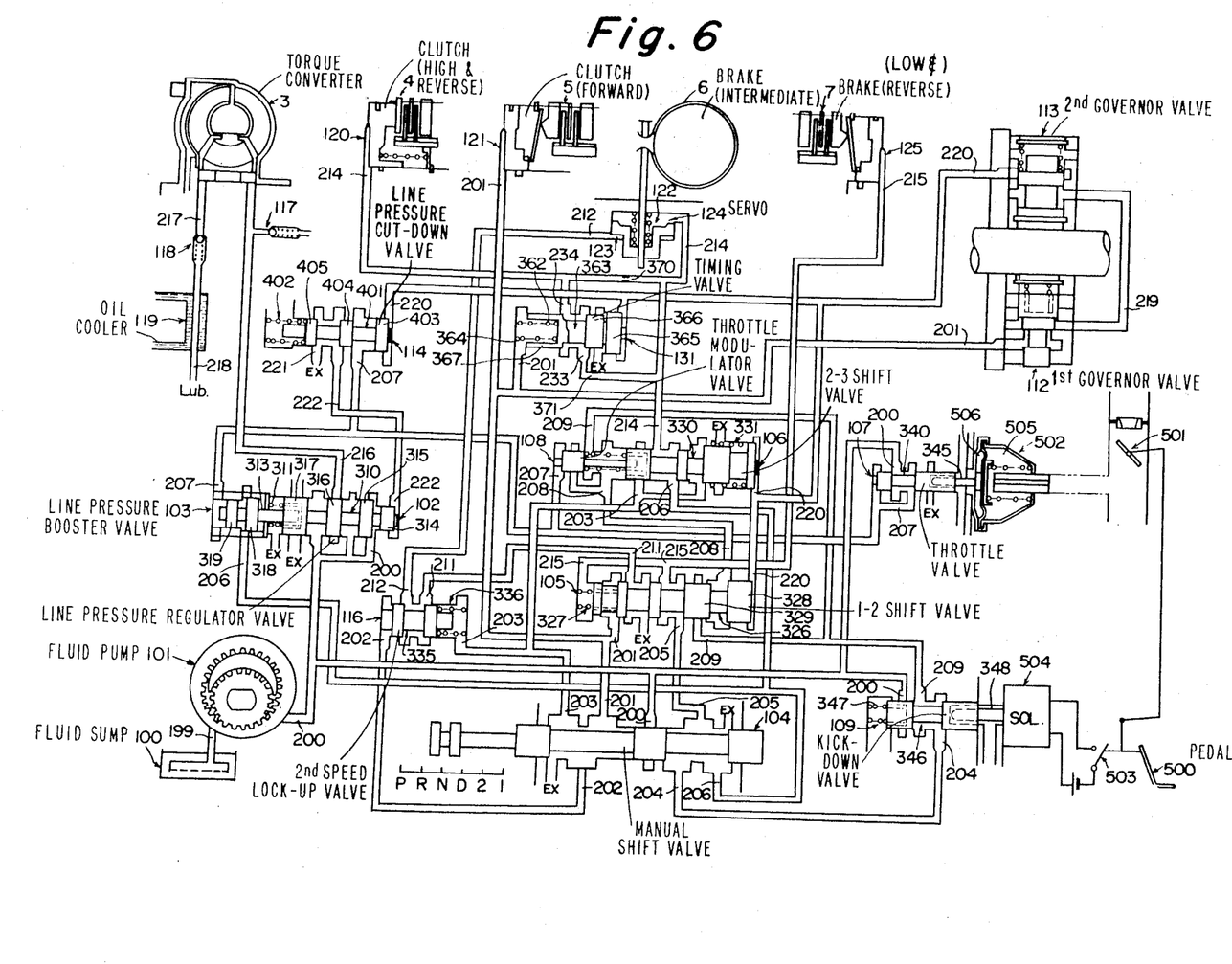
FIGS. 6 and 7 show other embodiments of the timing valve shown in FIGS. 2 and 3.

FIG. 6 shows a second embodiment of the timing valve according to the invention. The hydraulic control system shown in FIG. 6 is similar to that shown in FIG. 2 except for the timing valve 131, so that detailed explanation will not be necessary.

The timing valve 131 comprises a valve spool 363 and a biasing spring 364. Line pressure through passage 201 is applied to the left end surface of the spool 363, and governor pressure through passage 220 is applied to the right end surface of the spool 363 as before. As line pressure is higher than throttle pressure, three lands 365, 366 and 367 having area difference are provided to compensate for the urging forces, and the groove between lands 365 and 366 is exhausted.

Figure 5:
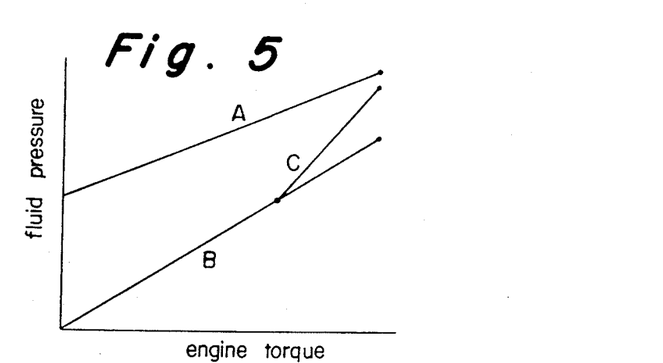
FIG. 5 shows fluid pressure increasing as engine torque increases.

As shown in FIG. 5, line pressure is also low when the engine torque is low, so that when governor pressure exceeds the urging force of the spring 364 and line pressure by the area difference, the valve spool 363 is urged leftward to block communication between passages 233 and 234 as before. Thus, fluid through passage 214 flows only through the restriction 370, so that engagement of the friction clutch 4 is delayed to cause the neutral position of the engagement of the disengagement of clutch 4 and the brake 6 and to perform smooth shifting suitable to the low engine torque condition. Operation of the timing valve 131 is similar to that of the timing valve 130 shown in FIG. 2. At position R of the manual shift valve 104, as no fluid pressure is applied to line pressure passage 201 and governor pressure passage 220, the valve spool 363 is maintained to the rightward position shown in FIG. 6 by the biasing spring 364 to maintain communication between passages 233 and 234, so that no effect is caused by the timing valve 131.

Figure 7:
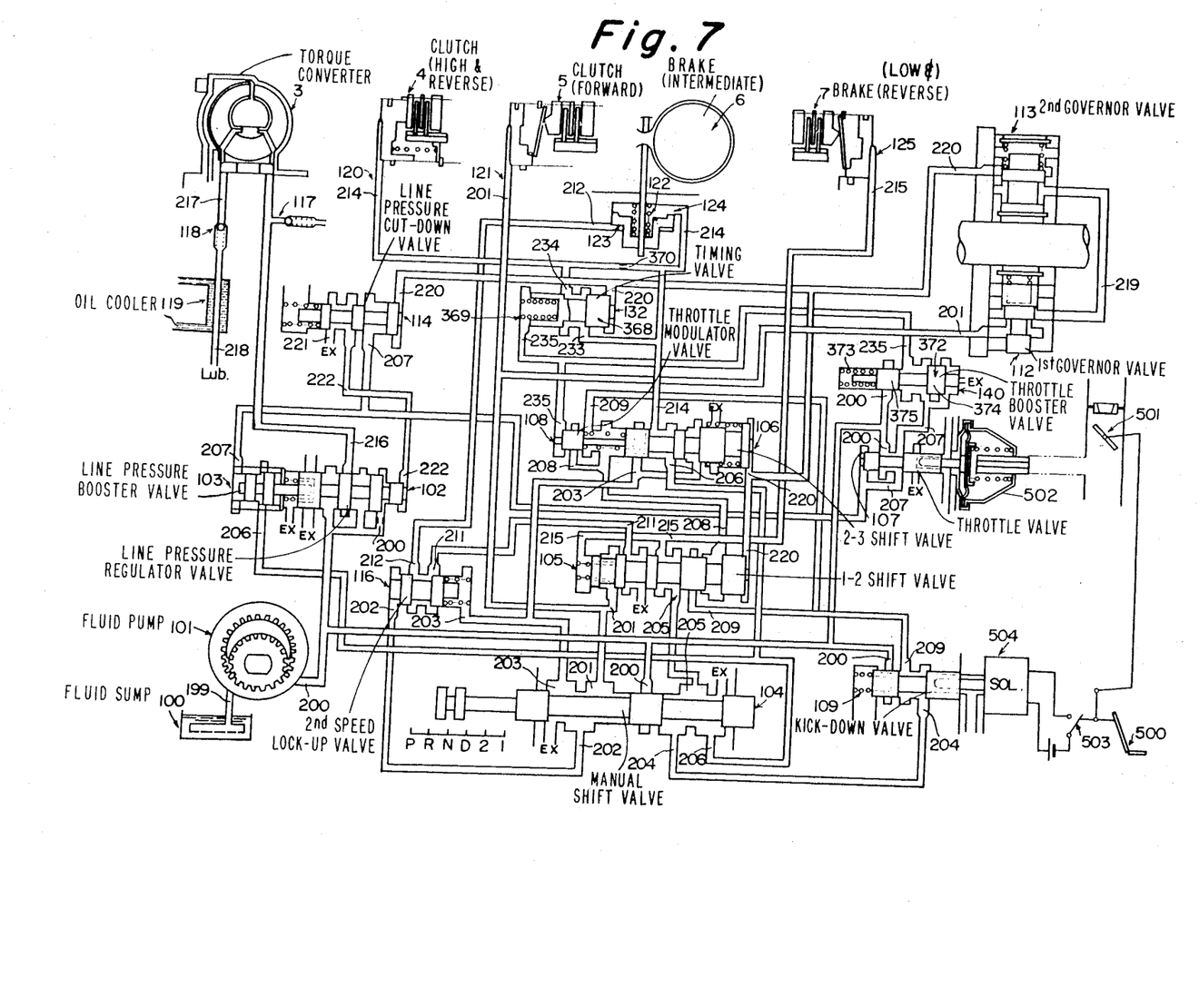

FIG. 7 shows a hydraulic control system providing a throttle booster valve 140 and a timing valve 132 according to a third embodiment of the present invention. Other parts of the hydraulic control system shown in FIG. 7 are similar to that hydraulic control system shown in FIG. 2, for the sake of clarity.

The throttle booster valve 140 comprises a valve spool 372 and a biasing spring 373, and is communicated to throttle pressure in passage 207 connected to a first port at the right end surface and to its second port. Throttle pressure is selectively communicated with passage 235 at a third port, and line pressure is applied through passage 200 to the fourth port. When throttle pressure is low, the urging force of the throttle pressure on the right end surface of land 374 of the spool 372 is less than the biasing force of the spring 373, the same throttle pressure being applied to the area difference between lands 374 and 375, so that the spool 372 is maintained in the rightward position shown in FIG. 7, thus making the throttle boost pressure through passage 235 equal to the throttle pressure through passage 207, as shown in FIG. 5 in which throttle boost pressure line C coincides with throttle pressure line B.

When the urging throttle pressure applied to the right end surface of the spool 372 is increased beyond the biasing force, the spool 372 is urged leftward to partially open line pressure passage 200, and a balance is produced between the throttle pressure and the biasing force of the spring 373, producing a fluid pressure higher than throttle pressure but lower than line pressure and which is applied to the area difference between lands 374 and 375. This fluid pressure is applied through passage 235 as throttle boost pressure to the throttle modulator valve 108 and the modulated pressure is applied to the 2-3 shift valve 106 and the 1-2 shift valve 105, in place of throttle pressure in the hydraulic control system shown in FIG. 2, to attain suitable shift point in relation to the engine torque.

The timing valve 132 comprises a valve spool 368 and a biasing spring 369. Governor pressure through passage 220 and throttle boost pressure through passage 235 are applied to the right and left end surfaces respectively. Other connections and operations of the timing valve 132 is similar to the timing valve 130 shown in FIG. 2. As before, when the urging force of the governor pressure through passage 220 is smaller than biasing force of the spring 369 and throttle booster pressure through passage 235, the valve spool 368 is maintained to the right end position shown in FIG. 7, so that applied line pressure through passage 214 flows freely through passages 233 and 234 to the hydraulic servo 120 of the friction clutch 4. Thus the friction clutch 4 engages quickly to perform smooth shifting at the high engine torque condition.

On the contrary, when the urging force by governor pressure exceeds the biasing force by the spring and throttle boost pressure, the spool 368 is urged leftward to block communication between passages 233 and 234, so that fluid through passage 214 flows only through the restriction 370 to the hydraulic servo 120. Thus, engagement of the friction clutch 4 is delayed to cause a neutral condition of both disengagements of the clutch 4 and the brake 6, to perform suitable shifting without any excess shock at the low engine torque operating condition.

It will be appreciated that by providing the timing valve 130, 131 or 132 according to the present invention, engagement of the friction clutch 4 is delayed at low engine torque operating conditions, to cause much less overlap of both the engagement or neutral condition of both disengagements of the friction clutch 4 and the friction brake 6, and to prevent any excess shock caused by braking at the output shaft of low engine condition. Consequently, by providing the timing valve to control timing relation between engagement and disengagement of the friction elements, smooth shifting between gear ratios is performed all through different engine torque.

What is claimed is:

1. A hydraulic control system for automatic transmission mechanisms for vehicles, said transmission mechanism having an input and an output shaft, at least one planetary gear unit disposed between said shafts, and a plurality of friction elements including a first friction element connected to said planetary gear unit for effecting a plurality of gear ratios, said gear ratios including a plurality of forward drive gear ratios, said gear ratios obtained by selectively engaging said friction elements by hydraulic pressure produced in said hydraulic control system, said hydraulic control system comprising, a fluid pump for producing line pressure. a line pressure regulator valve communicating with said pump for controlling said line pressure, a plurality of hydraulic servo means communicating with said pump for actuating said friction elements upon introduction of line pressure to said servo means, said hydraulic servo means including a first hydraulic servo for actuating said first friction element to attain a higher gear ratio, shift valve means controlling distribution of line pressure to said servo means, a governor valve means connected to the regulated line pressure, said governor means producing a governor output pressure representing vehicle speed, governor pressure passage means connecting said governor with said shift valve means, means for producing a hydraulic pressure representing engine torque communicating with said fluid pump, a hydraulic pressure passage means communicating with said hydraulic pressure representing engine torque with said shift valve means, a first passage communicating said shift valve means to said first hydraulic servo for introducing line pressure to said servo, a fluid flow restriction being provided in said first passage, a second passage connected to said first passage for bypassing said restriction, a timing valve means positioned in said second passage to selectively block said second passage, said governor pressure passage being in communication with one end of said timing valve means, and said hydraulic pressure passage means being in communication with the other end of said timing valve means, whereby, upon application of a high governor pressure at a high vehicle speed and low engine torque conditions, said timing valve means blocks the passage of fluid through said second passage, thereby causing a delay in engagement of the first friction element.

References Cited
UNITED STATES PATENTS

| | | | |
|---|---|---|---|
| 3,310,991 | 3/1967 | Leonard | 74—869X |
| 3,362,261 | 1/1968 | Snyder et al. | 74—869X |
| 3,393,585 | 7/1968 | Pierce, Jr. | 74—869X |
| 3,394,622 | 7/1968 | Chana | 74—867 |
| 3,446,098 | 5/1969 | Searles | 74—869 |

ARTHUR T. McKEON, Primary Examiner

U.S. Cl. X.R.

74—731